June 14, 1949.　　　　　I. G. RAMBO　　　　　2,473,388
TUBING COUPLER
Filed March 8, 1945　　　　　　　　　　　　2 Sheets-Sheet 1
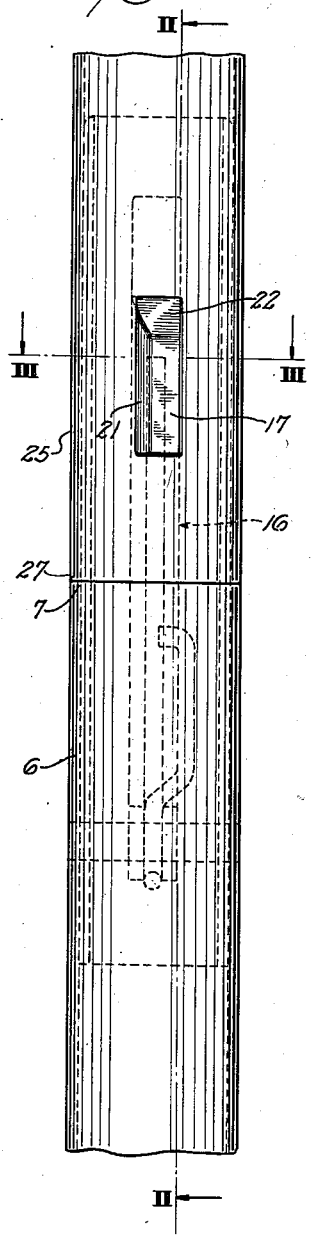
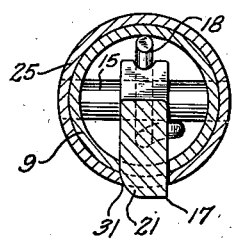
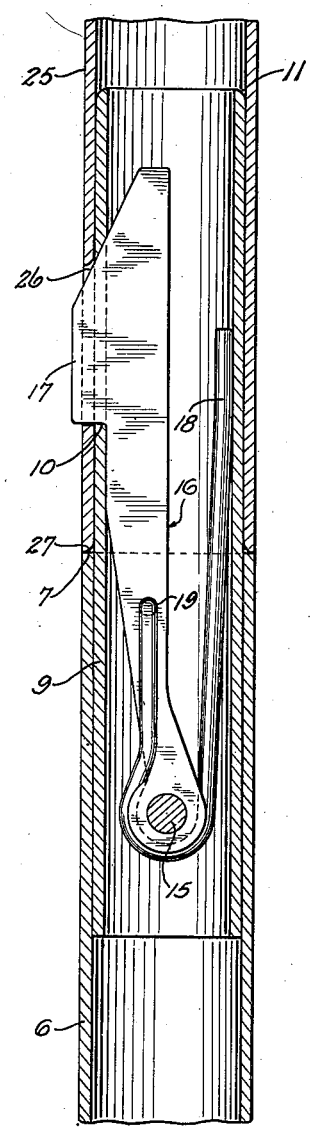
INVENTOR.
INGAR G. RAMBO
BY John W. Michael
ATTORNEY.

June 14, 1949.　　　　I. G. RAMBO　　　　2,473,388
TUBING COUPLER
Filed March 8, 1945　　　　　　　　　　2 Sheets-Sheet 2
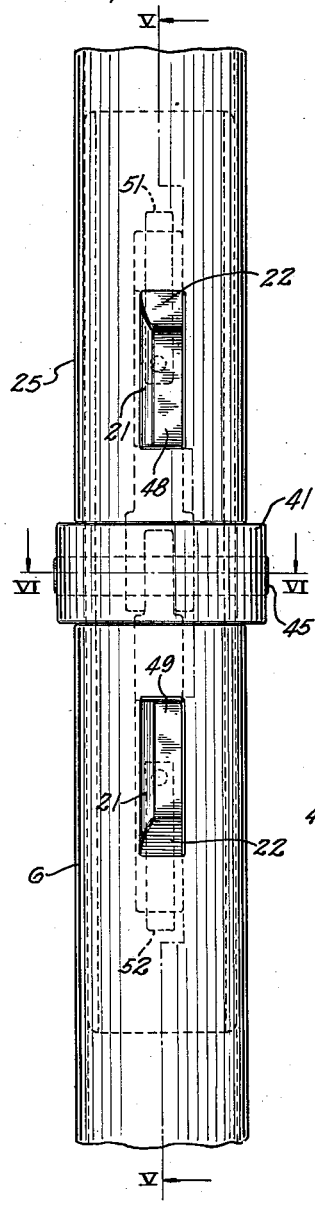
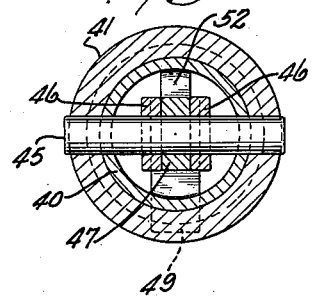
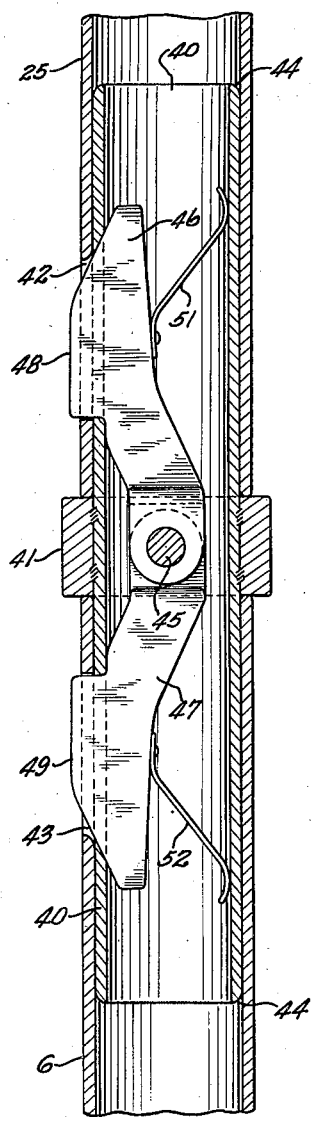
INVENTOR.
INGAR G. RAMBO
BY John W. Michael
ATTORNEY.

Patented June 14, 1949

2,473,388

UNITED STATES PATENT OFFICE 2,473,388

TUBING COUPLER

Ingar G. Rambo, Wauwatosa, Wis., assignor to Safway Steel Products Inc., Milwaukee, Wis., a corporation of Wisconsin Application March 8, 1945, Serial No. 581,597

12 Claims. (Cl. 287—103)

This invention relates to improvements in connectors or couplers for tubing and particularly to a coupling for tubing lengths which are required to remain connected under tension and compression or under unidirectional torque.

It is one object of the present invention to provide a coupling for tubing in which the several tubing lengths are to be quickly and positively connected and disconnected.

Another object of the invention is to provide a coupling for tubing lengths in which the coupling may be connected or disconnected merely by relative rotation of the coupling and a tubing length in one direction without observation of the coupling or uncoupling action.

Another object of the invention is to provide a tubing coupling with a positive stop against relative rotation between the joined lengths of tubing in one direction to assure complete connection of the tubing lengths from a point remote from the coupling itself.

Another object of the invention is to provide a connector for tubing lengths in which both the coupling and uncoupling actions may be positively and quickly performed without observation of the coupling or uncoupling actions, and remote from the coupling itself, and which requires only insertion of the coupling into one tubing length and relative rotation of the lengths for coupling and reverse relative rotation and withdrawal of one length from the other length for uncoupling.

Another object of the invention is to provide a coupling for joining two lengths of tubing and separable from both the tubing lengths, and in which each connection may be made separately by relative rotation of the coupling and the tubing length or by the insertion of the coupling in one tubing length followed by the placing of a second tubing length in a predetermined position over the portion of the coupling protruding from the first tubing length.

Objects and advantages other than those above set forth will be apparent from the following description when read in connection with the accompanying drawings, in which:

Fig. 1 is an elevational view of fragments of two lengths of tubing connected by a coupling fixed in one of the tubing lengths, the parts of the coupling within the tubing lengths being indicated in dotted lines;

Fig. 2 is a vertical sectional view taken on the plane of the line II—II of Fig. 1;

Fig. 3 is a horizontal sectional view taken on the plane of the line III—III of Fig. 1;

Fig. 4 is an elevational view of a fragment of two tubing lengths joined by a coupler separable from each of the lengths;

Fig. 5 is a vertical sectional view taken on the plane of the line V—V of Fig. 4; and Fig. 6 is a horizontal sectional view taken on the plane of the line VI—VI in Fig. 4.

Referring more particularly to the drawings, the reference numeral 6 designates a tubing length having at least one end 7 thereof cut on a plane at right angles to the axis of the tubing. A coupling tube 9 is fitted into the tubing at the end 7 and extends therefrom preferably for a distance equal to the length of the coupling tube 9 within the tubing 6. The coupling 9 is preferably of the same wall thickness as the tubing 6 and is permanently fastened in such tubing in any suitable manner.

The wall of the coupling tube 9 is formed with an opening or slot 10 generally rectangular in shape and formed through the portion of the coupling tube extending beyond the tube 6. A pin 15 extends across the coupling tube 9 preferably on a diameter thereof and preferably extends through both the tubing 6 and the coupling tube so that the pin may serve as additional means for joining the tubing 6 and the tube 9. However, the primary function of the pin 15 is to serve as a pivot for a latch, generally designated at 16, which is mounted in the coupling tube and extends beyond the slot 10 in such tube 9. The latch 16 is formed with a nose 17 extensible through the slot 10 and urged into the slot by a spring 18 acting between the latch and the tube and shown as being of the round or rectangular leaf type fixedly engaged at one end in the latch as shown at 19 and seated in a groove about the pivoted end of the latch and movably bearing on the inner surface of the coupling tube 9 at the other end of the spring. It will be seen from Figs. 1 and 3 that the latch nose 17 has a beveled side 21 and a beveled end 22 for a purpose which will appear hereinafter, while the other side and end of the latch nose are not beveled. The body of the latch nose 17 in the slot 10, when extended through the slot as far as possible, is preferably so dimensioned as to fit relatively closely in the slot.

A tube length 25, of an internal diameter fitting snugly over the coupling tube 9, is formed with a slot 26 through one wall thereof and of approximately the same size as the coupling tube slot 10. The slot 26 is so located in the tubing 25 as to be registrable with the slot 10 when the squared end 27 of the tubing 25 abuts the end 7 of the tubing 6. The end 27 of the tube 25 is slightly beveled internally thereof to form a surface which will ride easily over the beveled end 22 of the latch nose 17 when the coupling is inserted into the tubing 25. One edge 31 of the slot 26 is also beveled to coact with the beveled side 21 of the latch nose, as will appear hereinafter, while the other edges of the slot 26 are unbeveled and extend substantially at right angles to the surfaces of the tubing.

When two tubing lengths are to be coupled, the coupling tube 9 is inserted into the end 27 of tubing 25, and the two tubing lengths are pushed toward each other until their ends 7 and 27 abut. The tubing end 27 rides over the beveled end 22 of the latch nose 17 and presses the latch into the coupling tube 9 against the action of the spring 18. If the slots 10 and 26 in the coupling tube 9 and in the tubing 25, respectively, are in registry when the tubing ends 7 and 27 come into abutting relation, the spring 18 immediately urges the latch nose 17 through the slots. The non-beveled edges of the slots and the non-beveled sides of the nose then engage and hold the tubing lengths in coupled relation against tension or against torque in one direction, such direction being clockwise rotation of tubing 6 relative to tubing 25 when the tubes are in the position shown in the drawing. If the slots 10 and 26 are not in registry when the tubing ends 7 and 27 abut, it is merely necessary to rotate the tubing 6 relative to the tubing 25 and for a slight distance to bring the slots into registry, at which time the nose 17 is urged into the slots. Engagement of a non-beveled edge of the slots with the non-beveled side of the nose prevents further movement in the clockwise direction of the tubing length 6 relative to length 25, and hence serves as a positive stop and indication that the coupling is in connecting position.

When the tubing lengths are to be uncoupled, the tubing 6 is rotated counter-clockwise relative to the tubing 25. The beveled edge 31 of the slot 26 then rides over the beveled side 21 of the latch nose 17 and forces the latch into the coupling tube against the action of the spring. As soon as the tubing 25 rides entirely over the nose, the tubing lengths can be disconnected by withdrawal of the tubing length 6 and the coupling tube 9 from the tubing 25.

In the modification shown in Figs. 4, 5, and 6, the structure is generally similar to that above disclosed and similar parts are designated by the same reference numerals. A modified coupling tube 40 is not however, fixed in either of the tubing lengths 6 or 25, but is freely slidable therein and is fitted with a collar 41 of greater thickness than the wall thickness of the tubing lengths and located substantially at the central section of the coupling tube. The coupling tube 40 is provided with two substantially rectangular slots 42 and 43 through the wall thereof and preferably equidistant from a pivot pin 45 extending through the collar 41. Two latches 46 and 47 are so mounted on the pivot 45 that the latching noses 48, 49 are in line and hence the pivot end of one of the latches must be forked or otherwise specially shaped. The latches are severally urged into the slots in the coupling tube and in the tubing lengths by springs 51 and 52 fastened at one end in a suitable manner to the latches 46 and 47, respectively, and freely sliding on the inner surface of the tube 40 at the other end. The form of the slots in the tubing lengths 6 and 25 is as above described in connection with Figs. 1, 2, and 3, and the sides and ends of the latching noses 48 and 49 are likewise formed as above described, and as indicated at 21 and 22.

In view of the fact that the several latches are of the same length and general form and are in line in the coupling tube, the slots in the coupling tube and in the tubing lengths come in the locations in which the slots may register. Hence, the coupling can be used interchangeably in any two tubing lengths in which the same size slots are formed in the same location relative to the end of the tube. The present couplings are particularly advantageous in replacing the coupling pins heretofore used in metal frame scaffolding and produce a structure of greater rigidity and safety than was possible heretofore.

The present couplings have particular utility in connection with long lengths of tubing and frames, such as are used for example in scaffolding of the character shown in Patent 2,203,114 to Uecker, Beatty and the present applicant, on June 4, 1940. In such scaffolding, tubing of lengths of the order of fifteen feet are commonly used and a number of frames are superposed. It is accordingly desirable that the tubing be connectible merely by insertion of the connector into one tubing length and by relative twisting of the two engaged lengths of tubing from points remote from the coupling and without observation of the coupling action. The several latch parts should be so formed that the latch is readily engaged and that the engagement is positively stopped when completed with no need for observation of the coupling action. Uncoupling of such lengths of tubing is likewise easy and is also positive regardless of the remoteness of the user from the coupling when two lengths are disconnected.

It will, of course, be apparent that, when the modified coupling is to be used in connecting such scaffolding parts as the end frames, the slots, in the vertical members of the frames to be joined, must be on the same side and in line, and the connection must be made by placing the vertical members of one of the frames over couplings already in place in another frame.

Although but a few embodiments of the present invention have been illustrated and described, it will be apparent to those skilled in the art that various changes and modifications may be made therein without departing from the spirit of the invention or from the scope of the appended claims.

I claim:

1. In a connector for two lengths of tubing, a coupling comprising a tube fixed in and extending from the first length of tubing, the tube having a slot through the wall thereof, the second length of tubing having a slot through the wall and adjacent an end thereof for registry with the tube slot when the tubing ends abut, one side of the tubing slot parallel with the tubing axis being beveled, a latch pivotally mounted in the coupling tube, and resilient means urging the latch into the slots upon registry thereof, the latch having a nose portion beveled on the side thereof engageable with the beveled side of the tubing slot for release of the tubing from the tube upon relative rotation therebetween in one direction.

2. In a connector for two lengths of tubing, a coupling comprising a tube fixed in and extending from the first length of tubing, the tube having a slot through the wall thereof, the second length of tubing having a slot through the wall and adjacent an end thereof for registry with the tube slot when the tubing ends abut, the tubing end adjacent the slot therein being internally beveled, and one side of the slot parallel with the tubing axis being beveled, the second length of tubing having a bore substantially equal to the external diameter of the extending portion of the coupling tube and fitting thereover, a latch pivotally mounted in the coupling tube, and resilient means urging the latch into the slots upon registry thereof, the latch having a nose portion beveled on the side thereof engageable with the beveled edge of the tubing slot and having a beveled end portion engageable with the beveled end of the second length of tubing.

3. In a connector for two lengths of tubing, a coupling comprising a tube fitted for insertion into the tubing lengths, the tube having a plurality of slots through the wall thereof, the several lengths of tubing having slots through the walls and adjacent one of the several ends thereof for registry severally with the tube slots when the tubing ends abut on the coupling tube, a plurality of latches pivotally mounted in the coupling tube, and resilient means urging each latch into a tube slot and a tubing slot upon registry thereof.

4. In a connector for two lengths of tubing, a coupling comprising a tube fitted for insertion into the tubing lengths, the tube having a plurality of axially alined slots through the wall thereof, the several lengths of tubing having slots through the walls and adjacent the ends thereof for registry with the tube slots when the tubing ends abut on the coupling tube, a plurality of latches pivotally mounted and axially aligned in the coupling, and springs severally urging the latches into the tube and tubing slots upon registry of the slots in pairs.

5. In a connector for two lengths of tubing, a coupling comprising a tube fitted for insertion into the tubing lengths, the tube having a plurality of slots through the wall and alined along the axis of the tube, the several lengths of tubing having slots through the walls and adjacent the ends thereof for registry with the tube slots, a collar mounted on the coupling tube and forming an abutment for the ends of the tubing lengths to be coupled, the tube and tubing slots being in registry upon abutment of the tubing length ends on the collar, and a plurality of latches pivotally mounted in the coupling tube, and resilient means for biasing each latch into a tube slot and a tubing slot upon registry thereof.

6. In a connector for two lengths of tubing, a coupling comprising a tube fixed in and extending from a first length of tubing, the tube having a slot through the wall thereof, the second length of tubing having a slot adjacent one end thereof to register with the tube slot when the tubing ends abut, the end of the tubing adjacent the slot and one slot side parallel to the tubing axis being internally beveled, a latch pivoted in the tube and having a nose portion engageable in the slots when in registry, the nose portion being beveled on the end engageable with the beveled end of the tubing and being beveled on the side engageable with the beveled side of the tubing slot and a spring urging the latch into the slots.

7. In a connector for two lengths for tubing, a coupling comprising a tube inserted in and extending from a first length of tubing, the tube having a plurality of slots severally adjacent the tube ends, the slots being alined axially of the tube, the several tubing lengths having slots severally formed through the walls thereof and adjacent one of the ends thereof, one side of each of the tubing slots being internally beveled, the beveled sides of the slots corresponding in position, a plurality of latches severally pivoted in the tube for movement into the slots, the latches severally having nose portions beveled on the sides severally engageable with the beveled tubing slot sides, springs severally urging the latches into the tube and tubing slots upon registry of the slots in pairs, and a collar fixed on the tube and forming an abutment for the tubing ends whereby the tube and tubing slots are brought into registry in pairs.

8. In a connector for two lengths for tubing, a coupling comprising a tube inserted in and extending from a first length of tubing, the tube having a plurality of axially alined slots severally adjacent the tube ends, the tubing lengths having slots severally formed through the walls thereof, adjacent one of the ends of the several tubing lengths, for registration with the tube slots, one side of each of the tubing slots and the end of each tubing length adjacent the several slots therein being internally beveled, the beveled sides of the tubing slots corresponding in position, a plurality of latches severally mounted in axial alinement in the tube, and severally having end and side nose portions co-acting with the beveled tubing ends and slot sides, springs severally urging the latches into the slots when in registry and a collar fixed on the tube and substantially midway of the length thereof, the slots in the tube and the tubing forming registering pairs when the tubing ends abut on the collar.

9. The combination with cylindrical tubes fitting one within the other of coupling means releasable upon rotation of the tubes with respect to each other, said means comprising a latch pivotally carried by said one tube, said other tube having a slot, resilient means associated with the latch to project the latch into said slot, and inclined plane means acting between the slot and latch to move the latch inwardly out of the slot in response to rotation of one tube with respect to the other.

10. The combination with cylindrical tubes fitting one within the other of coupling means releasable upon rotation of the tubes with respect to each other, said means comprising a latch pivotally carried by said one tube, said other tube having a slot, resilient means associated with the latch to project the latch into said slot, a face of said latch being inclined with respect to an edge of said slot to move the latch inwardly out of the slot in response to rotation of one tube with respect to the other.

11. The combination with cylindrical tubes fitting one within the other of coupling means permitting co-axial movement of the tubes towards each other to the coupled position and preventing movement of the tubes away from each other from the coupled position until released in response to relative rotational movement of the tubes, said means comprising a latch pivotally carried by said one tube, said other tube having a slot, resilient means associated with said latch to urge the latch outwardly in a generally radial direction to project into said slot, a portion of said latch being inclined with respect to the end of said other tube so that the latch is moved inwardly when said end acts on said portion, another portion of said latch being inclined with respect to an edge of said slot to move the latch inwardly to release the projection of said latch in said slot when the tubes are rotated with respect to each other.

12. The combination with cylindrical tubes fitting one within the other of coupling means permitting co-axial movement of the tubes towards each other up to but not beyond the coupled position and preventing movement of the tubes away from each other from the coupled position until released in response to relative rotational movement of the tubes, said means comprising a latch pivotally carried by said one tube, said other tube having a slot, resilient means associated with said latch to urge the latch outwardly in a generally radial direction to project into said slot, a portion of said latch being inclined with respect to the end of said other tube so that the latch is moved inwardly when said end acts on said portion, a second portion of said latch projecting into the slot and preventing movement of the tubes away from each other, another portion of said latch being inclined with respect to an edge of said slot to move the latch inwardly to release the projection of said latch in said slot when the tubes are rotated with respect to each other, and shoulder means fixed with respect to said one tube to prevent movement of said tubes towards each other beyond the coupled position.

INGAR G. RAMBO.

REFERENCES CITED

The following references are of record in the file of this patent:

UNITED STATES PATENTS

| Number | Name | Date |
|---|---|---|
| 144,888 | Campbell | Nov. 25, 1873 |
| 156,497 | Peter | Nov. 3, 1874 |
| 310,672 | Hackley | Jan. 13, 1885 |
| 526,448 | Karschner | Sept. 25, 1894 |
| 534,434 | Frost | Feb. 19, 1895 |
| 612,989 | Hunter et al. | Oct. 25, 1898 |
| 691,759 | George et al. | Jan. 28, 1904 |
| 763,837 | Bailey | June 28, 1904 |
| 958,751 | Lovett | May 24, 1910 |
| 1,189,802 | Eckert | July 4, 1916 |
| 1,844,410 | Schalk | Feb. 9, 1932 |
| 2,243,190 | Capaldo | May 27, 1941 |